United States Patent

Delgado et al.

[11] Patent Number: 5,898,583
[45] Date of Patent: Apr. 27, 1999

[54] GATE DRIVE LATCHING CIRCUIT FOR AN AUXILIARY RESONANT COMMUTATION CIRCUIT

[75] Inventors: Eladio Clemente Delgado, Burnt Hills; Mustansir Hussainy Kheraluwala, Schenectady, both of N.Y.

[73] Assignee: General Electric Company, Schenectady, N.Y.

[21] Appl. No.: 09/017,572

[22] Filed: Feb. 2, 1998

[51] Int. Cl.[6] .............................. H02M 3/24; H02M 7/537
[52] U.S. Cl. ............................................. 363/98; 363/131
[58] Field of Search .................................. 363/95, 97, 98, 363/131, 132, 134

[56] References Cited

U.S. PATENT DOCUMENTS

| | | | |
|---|---|---|---|
| 4,009,430 | 2/1977 | Partridge | 363/95 |
| 4,086,621 | 4/1978 | Vukasovic | 363/136 |
| 4,088,937 | 5/1978 | Uchida et al. | 363/142 |
| 4,225,912 | 9/1980 | Messer | 363/96 |
| 5,038,267 | 8/1991 | Dedoncker et al. | 363/89 |
| 5,047,913 | 9/1991 | DeDoncker et al. | 363/95 |
| 5,172,309 | 12/1992 | Dedoncker et al. | 363/132 |

OTHER PUBLICATIONS

"Robust, High–Efficiency Controller For The Auxiliary Resonant Commutation Pole Power Converter," EC Delgado, MH Kheraluwala; Serial No. 08/622,504 (GE docket RD–24,837), filed Mar. 25, 1996.

Primary Examiner—Peter S. Wong
Assistant Examiner—Bao Q. Vu
Attorney, Agent, or Firm—Jill M. Breedlove; Douglas E. Stoner

[57] ABSTRACT

A gate drive latching circuit for an auxiliary resonant commutation circuit for a power switching inverter includes a current monitor circuit providing a current signal to a pair of analog comparators to implement latching of one of a pair of auxiliary switching devices which are used to provide commutation current for commutating switching inverters in the circuit. Each of the pair of comparators feeds a latching circuit which responds to an active one of the comparators for latching the associated gate drive circuit for one of the pair of auxiliary commutating switches. An initial firing signal is applied to each of the commutating switches to gate each into conduction and the resulting current is monitored to determine current direction and therefore the one of the switches which is carrying current. The comparator provides a latching signal to the one of the auxiliary power switches which is actually conducting current and latches that particular power switch into an on state for the duration of current through the device. The latching circuit is so designed that the only time one of the auxiliary switching devices can be latched on is during the duration of an initial firing command signal.

12 Claims, 4 Drawing Sheets

GATE DRIVE LATCHING CIRCUIT FOR AN AUXILIARY RESONANT COMMUTATION CIRCUIT

The United States Government has certain rights in this invention pursuant to Air Force Contract #F33615-93C-2366, NASA Contract NAS3-27015 and Navy Contract N61533-94-C-0012.

FIELD OF THE INVENTION

This invention relates generally to resonant power converters and, more particularly, to gate drive circuits for auxiliary switching devices in an auxiliary resonant commutating circuit of such converters.

BACKGROUND OF THE INVENTION

U.S. Pat. No. 5,047,913, which is assigned to the assignee of the present invention and is incorporated by reference herein, describes an auxiliary commutating circuit which is referred to as an auxiliary resonant commutation pole or phase leg (ARCP) circuit for enabling soft-switching, i.e., essentially zero-voltage switching (ZVS) of the main switching devices of a power converter and zero current switching (ZCS) of the auxiliary devices. The ARCP circuit comprises a pair of reversely poled electronic switching devices serially connected with an inductor and snubber capacitors, the inductor and capacitors forming a resonant circuit. The gating and conduction times of the switching devices of the ARCP circuit are controlled so as to establish essentially zero-voltage across the main switching devices of the converter when these latter devices are gated into conduction.

U.S. patent application Ser. No. 08/622,504, now abandoned describes an improvement in the ARCP circuit of U.S. Pat. No. 5,047,913, and, more particularly, to the controller associated with the ARCP switching devices to enhance efficiency, zero-voltage switching and fault tolerance. The disclosure of U.S. patent application Ser. No. 08/622,504 is hereby incorporated by reference. Notwithstanding the enhancements provided, the control circuit needed additional enhancement in order to be applied in high-power power conversion circuits, for example, converter circuits that operate in the range of 200 kilowatts and higher in which the dc link voltage is greater than about 500 volts and the ARCP phase leg current may be greater than 200 amperes. At such high levels of voltage and current, noise transients generated by high dv/dt and radiated electrical noise may be sufficient to disrupt the gate switching circuits. Accordingly, it is desirable to provide an ARCP circuit which has fault tolerance and noise immunity while operating at high power.

SUMMARY OF THE INVENTION

The present invention is illustrated in one form in a power converter having a pair of main switching devices serially connected between positive and negative voltage buses of a dc link, each of the devices being shunted by a corresponding anti-parallel coupled diode, and having an inductive load connected between a junction intermediate the switching devices and the negative voltage bus. A respective one of a pair of snubber capacitors is connected in parallel with each of the switching devices. In order to improve soft or zero-voltage switching, an ARCP circuit comprising a pair of reversely connected auxiliary switching devices and associated anti-parallel diodes is coupled between the junction intermediate the main switching devices and a capacitive voltage divider. The voltage divider is formed of two serially connected capacitors of substantially equal value connected across the dc link so that the voltage at the ARCP circuit is about one-half the dc link voltage. Control of the ARCP auxiliary switching devices is implemented using a fiber optic connection from an ARCP phase controller to the ARCP auxiliary gate driver circuit. A drive command from the phase controller turns on both the ARCP auxiliary switching devices concurrently. Once the output drive circuits of the auxiliary gate driver circuit are switched on, they control a set of MOS analog switches within an auxiliary current reconstruction functional block and release an analog integrator. A signal from an embedded turn in a resonant inductor of the ARCP circuit is used by the analog integrator in order to reconstruct the auxiliary circuit current. Two analog comparators with preset references are connected to the output of the integrator and determine the conduction state of the auxiliary power semiconductor switches. This circuit determines which of the two auxiliary power switches is actually conducting current based upon the magnitude and polarity of the measured current. The gate driver circuit then proceeds to latch the specific auxiliary power switch which is conducting current by maintaining auxiliary gate power to that switch. The drive command to the auxiliary switching devices from the ARCP phase controller is of short duration and is approximately less than half the actual auxiliary switch conduction cycle. This drive command is held in the ON state long enough so that the reconstruct circuit and the comparators connected in that circuit can determine which of the auxiliary power switches are actually conducting current and latch on that particular power switch. When the drive command is extinguished, the auxiliary gate driver circuit turns off the power to the auxiliary switch which was not conducting. The voltage feedback signal from the single turn on the auxiliary resonant inductor is also used by the auxiliary current slope detection circuit to extract the polarity and slope of the auxiliary current. This data is then fed back to the ARCP phase controller so that proper timing and sequencing of the ARCP can be accomplished.

The latch enable circuit in the auxiliary gate driver circuit is implemented so that once the optical drive command input to the auxiliary gate driver circuit is removed, the auxiliary circuit switching device which was not latched is locked out from latching on until a new drive command is received. This feature prevents erroneous latching during certain switching events of the ARCP circuit. The enhancement also prevents the latching of the non-conducting auxiliary switch during diode reverse recovery events in the auxiliary power circuit. The latch enable along with the latch functional block prevents electrical noise from spuriously latching on the auxiliary circuit switching devices. Using this circuit, the only time one of the two auxiliary switching devices can be latched on is during a drive command signal which is received optically from the ARCP phase controller. In addition, a power up reset circuit is added to the auxiliary gate driver circuit to hold the integrator circuit in a reset condition during the power up sequence of the gate drive. In case of a short power interruption, the power up reset circuit holds the integrator circuit in a reset condition for a predetermined time constant thus preventing the auxiliary gate drive from firing prematurely or erroneously.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
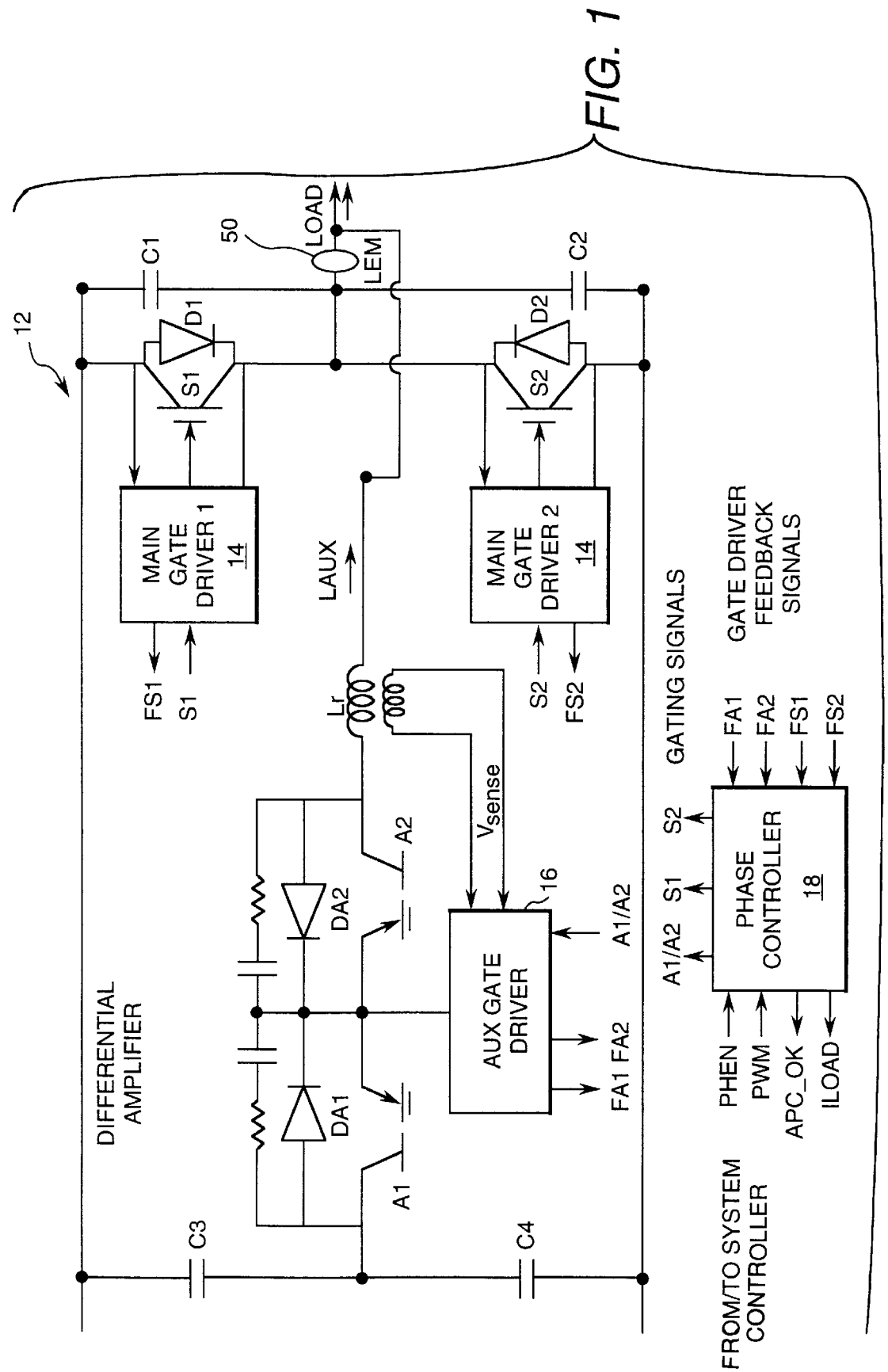
FIG. 1 is a functional block diagram of an ARCP system in accordance with the present invention.

FIG. 1 illustrates an ARCP circuit 10 for an inverter pole, or phase leg 12. The inverter phase leg 12 is illustrated as comprising two main switching devices S1 and S2, which by way of example are shown as comprising insulated gate bipolar transistors (IGBT's), connected in series between the positive and negative buses of a dc supply Vdc. Each main switching device has an anti-parallel diode D1 and D2, respectively, and a snubber capacitor C1, C2, respectively, connected thereacross. The ARCP circuit 10 is coupled between a junction joining the main switching devices S1 and S2 and a junction joining a pair of substantially equivalent "bus-splitting" filter capacitors C3, C4 which are connected in series across the dc supply Vdc. The ARCP circuit 10 comprises two auxiliary switching devices A1 and A2 connected in series and oppositely poled and are shown, by way of example, as comprising MOS-controlled thyristors. Each auxiliary switching device A1 and A2, respectively, has an anti-parallel diode DA1 and DA2, respectively, connected thereacross with the cathodes of the auxiliary anti-parallel diodes connected together at the juncture between the two devices A1, A2. The control electronics are depicted as comprising three basic functional blocks: main gate driver circuits 14 for each main switching device S1 and S2; an auxiliary gate driver circuit 16 for the auxiliary commutation switching devices Al and A2; and a phase leg controller circuit 18.

The main switch gate driver circuits 14 may be of the form shown in the aforementioned U.S. patent application (RD-24837). In general, each driver circuit 14 receives a gating signal from the phase controller 18 and conditions the gating signal to a voltage and power sufficient to drive the associated one of the switches S1, S2 into conduction while holding the gating signal until voltage across the switch becomes zero. A status signal FS1 or FS2 is developed within a respective gate driver circuit 14 and is fed back to the phase leg controller 18 to indicate the output state (on or off) of the respective gate driver 14.

Each main gate driver 14 includes circuitry to effect zero-voltage switching while information about the status of the associated main switch is transmitted back to the phase leg controller 18 where decisions are made concerning the proper sequencing and timing of the main and auxiliary power devices of the ARCP phase leg.

Figure 2:
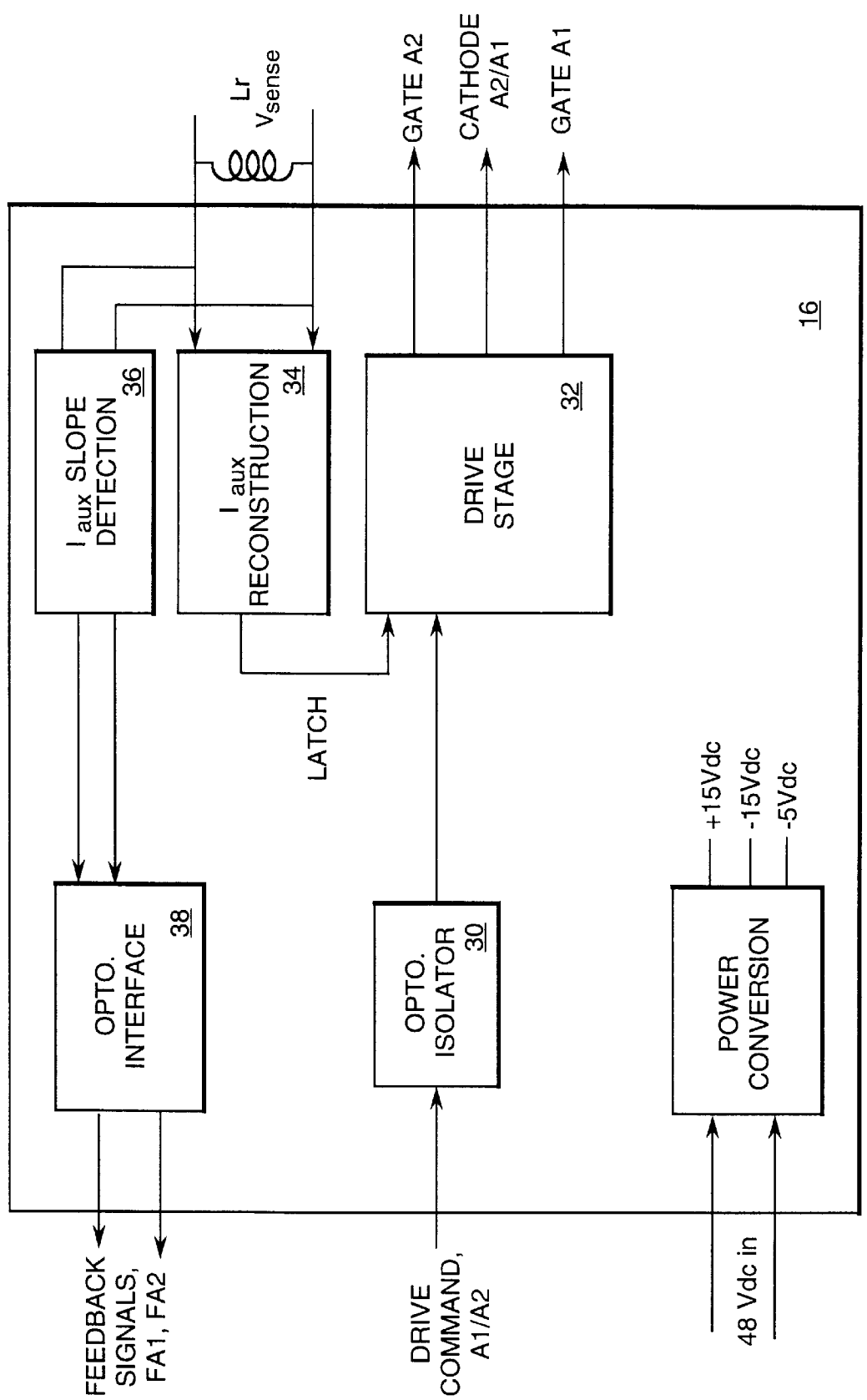
FIG. 2 is a functional block diagram of an auxiliary gate drive for the ARCP of FIG. 1 in accordance with the present invention.

FIG. 2 shows a functional block diagram of a gate driver circuit 16 for the auxiliary switching devices Al and A2 constructed in accordance with preferred embodiments of the present invention. A single firing command (A1/A2) from the phase leg controller 18 is optically isolated in an opto-isolator 30. The resulting signal is coupled to a signal conditioning, high-current drive stage 32 for enabling each of the auxiliary devices A1 and A2, i.e., upon receipt of the firing command, the drive stage 32 turns on both auxiliary switches A1 and A2. A current sensing circuit 34 determines which of the two devices A1, A2 is conducting current and latches that device on via a latch signal, while the other auxiliary switching device turns off when the firing command A1/A2 is removed.

Once the appropriate auxiliary switching device A1, A2 is latched on, the firing command can be removed without affecting device operation. The current seen by the auxiliary devices A1, A2 is a resonant pulse and the latched device is allowed to naturally commutate off when the resonant current pulse returns to zero. In a preferred implementation, the latching circuit removes the gate drive from the conducting device as soon as the resonant current through the device falls below a preset threshold, which is desirably just prior to the resonant current reaching zero.

A voltage sensing coil 33, preferably a single winding turn embedded in the resonant inductor LR of the ARCP circuit provides a voltage feedback signal representative of current in the inductor and therefore through the conducting one of the switching devices A1, A2. This signal is applied to the laux reconstruction circuit 34 which converts the voltage signal to a current signal from which the direction of current through the inductor Lr can be determined. Current direction identifies which of the devices A1, A2 is conducting and enables generation of the latching signal to maintain the gate drive to the conducting device. The sensing coil voltage is also detected by laux slope detection circuit 36 which provides digital feedback signals through opto-isolator 38 to phase controller 18 indicating the status of the devices A1, A2.

Figure 3:
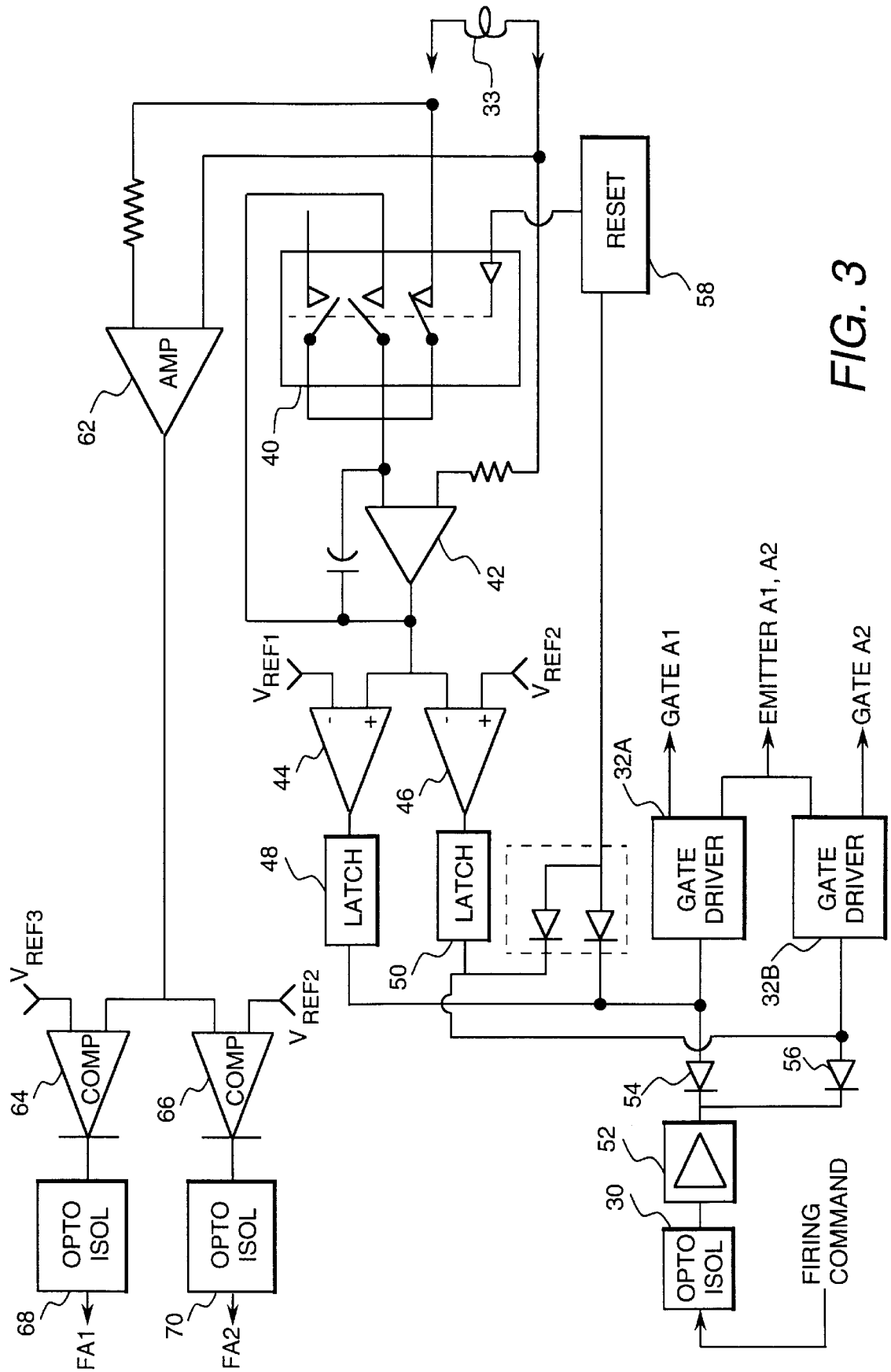
FIG. 3 is a more detailed view of the auxiliary gate drive of FIG. 2.

Turning now to FIG. 3, the signal generated on the voltage sensing coil 33 is coupled through an analog switch 40 to an integrator 42 which integrates the voltage signal to obtain an output representative of the resonant inductor current. The output of the integrator 42 is applied to a pair of comparators 44, 46 which compare the output to selected reference values $V_{REF1}$ and $V_{REF2}$. The integrator 42 output is coupled to the inverting input of comparator 44 and to the non-inverting input of comparator 46 so that one comparator senses current in one direction through the inductor Lr and the other comparator senses current in an opposite direction through the inductor, based upon whether the integrator output increases in a positive or negative direction as determined by the polarity of the voltage generated on coil 33. Each of the comparators 44, 46 output terminals are applied to respective latching circuits 48, 50 which function to latch the input terminal of an associated one of the gate driver circuits 32A, 32B forming drive circuit 32.

In the illustrative embodiment, the gate driver circuits 32A, 32B are identical high current drive circuits and are responsive to a low voltage, i.e., about ground potential, being applied to an input terminal for generating a gate drive signal. Actually, the illustrated embodiment of the invention uses "active low" signals throughout. The firing signal from phase controller 18 is coupled through the optical isolator 30 and an inverting amplifier 52 to the cathode terminals of a pair of diodes 54, 56. The anode terminals of the diodes 54, 56 are coupled to respective ones of the gate driver circuits 32A, 32B. The firing signal causes the amplifier 52 to pull down the cathodes of diodes 54, 56 applying essentially ground potential to each driver circuit 32A, 32B and causing the driver circuits to generate gating signals to devices Al, A2. When current in inductor Lr induces voltage in coil 33, that voltage is integrated by integrator 42 and applied to each comparator 44, 46. Depending on the polarity of the integrated voltage signal, one of the comparators 44, 46 will be driven low when the integrated voltage exceeds the respective reference voltage $V_{REF1}$ and $V_{REF2}$. Each of the comparators 44, 46 has an output terminal coupled to a corresponding one of the latching circuits 48, 50. The diodes 54, 56 isolate the latch signals produced by the latching circuits 48, 50 from each other so that only one gate driver circuit is latched at any time, even though a firing signal is sufficient to actuate both gate driver circuits.

The analog switch 40 provides a reset function for integrator 42 by short-circuiting the integrating capacitor 42A. The switch 40 is reset by reset circuit 58 on power-up and whenever both input terminals of driver circuits 32A, 32B are concurrently high, i.e., whenever no firing signal or latch signal is present. The input status of gate drivers 32A, 32B are combined through diode gate 60.

The circuit of FIG. 3 also provides feedback signals FA1, FA2 to the phase controller 18 to signify the slope and polarity of the auxiliary current. These signals are produced by amplifier 62 and comparators 64, 66. Amplifier 62 is connected to monitor voltage on coil 33 and provides an amplified version of that voltage to respective inverting and non-inverting input terminals of corresponding ones of the comparators 64, 66. When the amplified voltage exceeds one of the respective reference voltages $V_{REF3}$, $V_{REF4}$ coupled to the other input terminals of the comparators 64, 66, a signal is generated which indicates slope and polarity of the auxiliary current and thus also inferring which of the A1, A2 devices is conducting current. The signals from comparators 64, 66 are coupled through respective opto-isolators 68, 70 to the phase controller 18.

Figure 4:
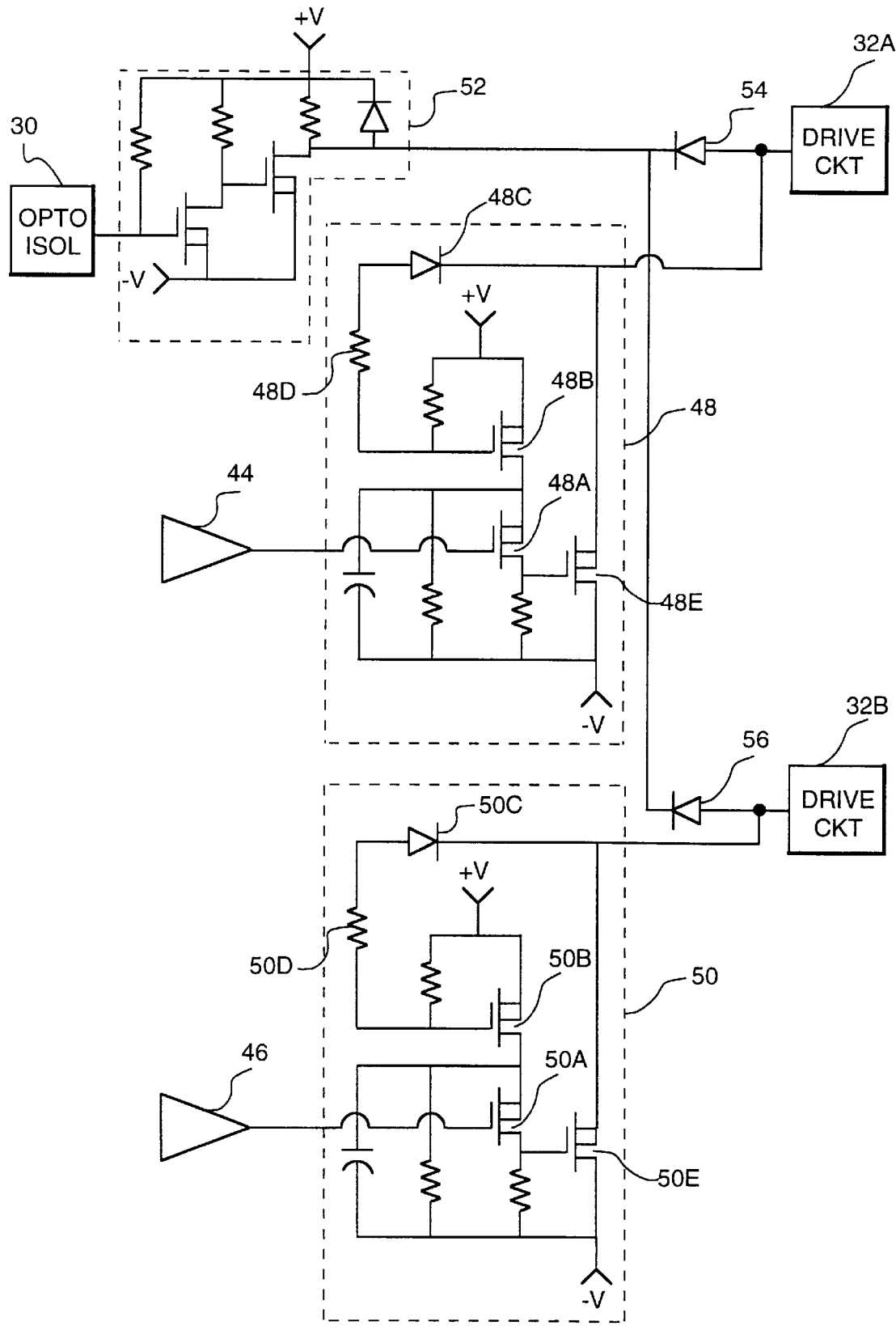
FIG. 4 is a schematic representation of the latching circuit for the gate drive of FIG. 3.

Referring to FIG. 4, there is shown a more detailed schematic representation of the latching circuits 48 and 50. Each circuit 48, 50 is identical and the description of the circuit 48 will be understood to apply equally to the circuit 50. As previously discussed, a firing signal received at optical isolator 30 is conditioned or inverted by inverting circuit 52 which circuit comprises a pair of MOSFET devices 52A, 52B which are gated into conduction by the firing signal resulting in a negative voltage being applied to the cathode of diodes 54, 56 during the time duration of the firing signal. When the cathodes of diodes 54, 56 are pulled low, both the drive circuits 32A and 32B are enabled and gating signals are applied to each of the auxiliary switching devices A1, A2. At least one of the devices A1, A2 will be forward biased at the time that the gating signal is received and that device will begin conducting current. Such current will pass through the resonant inductor Lr causing a voltage to be induced in sense winding 33. The sense winding voltage is integrated by integrator 42 and applied to each of the comparators 44, 46. Depending on the direction of current through inductor Lr, one of the comparators 44, 46 will have its output pulled low, wherein the low output comparator corresponds to the conducting one of the devices A1 and A2.

Assuming, for discussion, that comparator 44 has its output pulled low, the low signal is applied to the gate of MOSFET device 48A gating that device into conduction. However, device 48A cannot conduct unless a voltage is available at its source terminals and such voltage is only available if MOSFET device 48B is conducting. Device 48B is gated into conduction when a firing signal is received at drive circuit 32A by means of diode 48C whose cathode is connected to the anode of diode 54, the anode of diode 48C being coupled to the gate terminal of device 48B via series resistor 48D. Thus, both the firing signal and current in inductor Lr must be present to enable device 48A. A drain terminal of device 48A is connected to gate terminal of a MOSFET device 48E which is gated into conduction when device 48A is conducting. The source terminal of device 48E is connected to the cathode terminal of diode 48C so that with device 48E conducting, the diode cathode is latched to a negative voltage (-V) which maintains conduction of device 48B and a low voltage firing command at the input of gate driver 32A. Accordingly, once current in inductor Lr has been detected and latch circuit 48 enabled, the firing signal at gate driver circuit 32A will be enabled until current drops below the threshold set by reference source $V_{REF1}$ at comparator 44, which threshold may be substantially zero current. Note that with latch circuit 48 enabled, removal of the firing signal from inverting circuit 52 has no effect on the signal applied to driver circuit 32A.

As mentioned, latch circuit 50 operates in the same manner as latch circuit 48 except being responsive to the low output signal from comparator 46. So long as current continues to flow in the same direction through inductor Lr, i.e., with comparator 44 having a low output, the comparator 46 will continue to generate a high output and the latch circuit 50 will not be enabled. Thus, the gate driver circuit 32B will not generate firing signals to its associated switching device A2. However, if some anomaly does cause comparator 46 to produce a low output signal to latch circuit 50, that latch circuit will still not be enabled unless there is a firing signal from circuit 52 which pulls the cathode of diode 56 low so that device 50B (corresponding to device 48B) is enabled. The latching circuit design therefore prevents feedback from latching on a specific gate drive unless the firing signal is present.

While the circuit of FIG. 4 is implemented using MOSFET devices, it will be recognized that the devices are operated in a switching mode and that various forms of electronically controllable switching devices could be used to implement the circuit. For present purposes, the devices may be generally referred to as "transistors" and such terminology is intended to cover MOSFET devices as well as other electronic switching devices.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A latching driver circuit for a relatively high power auxiliary resonant commutation pole (ARCP) circuit, the ARCP circuit including at least two electronic switching devices connected in series in opposite polarity to each other and in series with an inductor forming part of a resonant circuit, the inductor including a current sense winding for providing a signal representative of current therethrough, said latching driver circuit;

an optical isolator for transmitting firing signals to said driver circuit for enabling gating of each of said at least two switching devices into conduction concurrently, said firing signals being relatively short in time duration compared to the desired on-time of a one of the switching devices conducting current;

first and second power stages responsive to said firing signals for generating gating signals for application to said at least two switching devices;

current sense means coupled for receiving the current representative signal and for determining therefrom the polarity of current through the inductor for identifying the one of the switching devices conducting current and generating a latch signal representative thereof; and latch means responsive to said latch signal for latching the gating signal to the current conducting one of the switching devices into an on state for the time duration of current through the one of the switching devices.

2. The latching driver circuit of claim 1 and including apparatus for inhibiting operation of a latching circuit coupled to a non-conducting one of the switching devices during conduction of the conducting one of the switching devices.

3. The latching driver circuit of claim 2 wherein said inhibiting apparatus comprises circuit means for inhibiting operation of said latching circuit in the absence of a firing signal.

4. The latching driver circuit of claim 2 and including circuit means responsive to the current representative signal for providing a feedback signal indicative of the conduction status of said switching devices.

5. The latching driver circuit of claim 3 wherein said current sense means comprises an integrator for receiving said current representative signal and a pair of comparators, said comparators being coupled for receiving an output signal from said integrator, said integrator output signal having a polarity determined by the polarity of voltage induced in the current sense winding by current through the inductor, each of said comparators being connected to produce a corresponding latch signal in response to opposite polarities of said output signal.

6. The latching driver circuit of claim 5 wherein said latch means comprises electronic switch means responsive to said latch signals for gating a respective one of the driver stages into conduction for the duration of said latch signals.

7. The latching driver circuit of claim 6 wherein said electronic switch means comprises a pair of latch circuits, each of said latch circuits being substantially identical and each being associated with a respective one of said comparators and a corresponding one of said power stages, each latch circuit including:

a first transistor having drain, source and gate terminals with the gate terminal coupled to an output of a respective one of the comparators and the drain terminal coupled through a resistor to a negative voltage;

a second transistor having drain, source and gate terminals with the drain terminal connected to the source terminal of the first transistor and the source terminal connected to a positive voltage;

a diode connected between the gate terminal of the second transistor and a firing signal terminal of a respective one of said first and second power stages for applying a gating signal to enable said second transistor and apply power to said first transistor only when said firing signal terminal is enabled;

a third transistor having gate, source and drain terminals with the gate terminal coupled to the drain terminal of the second transistor and the source and drain terminals connected respectively to the firing signal terminal of the respective one of the first and second power stages and the negative voltage whereby the firing signal terminal is latched to an enabled state when both a firing signal and a latch signal are concurrently present and thereafter held in an enabled state until the latch signal is removed.

8. In an auxiliary resonant commutated pole power converter phase leg of the type having at least two main switching devices coupled in series between relatively positive and negative dc voltage buses, each of said main switching devices having corresponding anti-parallel diodes connected thereacross, an auxiliary resonant commutated pole (ARCP) circuit comprising a pair of auxiliary switching devices connected in series in opposite polarity to one another, each of said auxiliary switching devices having corresponding anti-parallel diodes connected thereacross, and a resonant circuit coupled in series with said auxiliary switching devices, said resonant circuit including an inductor having a current sense winding embedded therein, each of the auxiliary switching devices being responsive to firing signals for establishing a resonant commutation interval for soft switching of the main switching devices, a method comprising the steps of:

receiving a firing signal for the ARCP circuit and generating therefrom a gating signal to each of the auxiliary switching devices concurrently;

detecting current in the inductor by sensing voltage on the current sense winding and determining;

the polarity of the voltage so as to identify the one of the auxiliary switching devices conducting current;

generating a latching signal in response to the step of detecting wherein the latching signal is associated with the current conducting one of the auxiliary switching devices; applying the latching signal to maintain the gating signal to the current conducting one of the auxiliary switching devices so long as current continues through the inductor; and removing the gating signal from the non-current conducting one of the auxiliary switching devices concurrently with cessation of the firing signal, wherein the firing signal is shorter in time duration than the gating signal.

9. The method of claim 8 and including the step of determining a magnitude of current in the inductor from the sensed voltage on the current sense winding.

10. The method of claim 8 wherein said step of detecting current includes the step of coupling the current sense winding to an electronic integrator wherein the polarity of voltage generated by the integrator is indicative of the direction of current through the inductor.

11. The method of claim 10 wherein said step of generating a latching signal comprises the step of applying the integrator voltage to an inverting and non-inverting input terminal, respectively, of a pair of electronic comparators wherein only one of the comparators provides a latching signal in response to the integrator voltage.

12. The method of claim 11 and including the step of resetting the integrator in response to zero-voltage detection on the current sense winding.

* * * * *